United States Patent
Prickel et al.

(10) Patent No.: US 10,259,513 B2
(45) Date of Patent: Apr. 16, 2019

(54) IMPLEMENT STEERABLE TRACK ASSEMBLY WITH PIVOTING STEERING ACTUATOR

(71) Applicant: CNH Industrial America LLC, New Holland, PA (US)

(72) Inventors: Marvin A. Prickel, Homer Glen, IL (US); Shivakumar Prodduturi, Naperville, IL (US); Tom Lykken, Fargo, ND (US); David Allen Zach, Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/599,653

(22) Filed: May 19, 2017

(65) Prior Publication Data
US 2017/0291651 A1    Oct. 12, 2017

Related U.S. Application Data

(63) Continuation of application No. 15/093,094, filed on Apr. 7, 2016, now Pat. No. 9,688,322.

(51) Int. Cl.
*B62D 55/084* (2006.01)
*B62D 55/116* (2006.01)
(Continued)

(52) U.S. Cl.
CPC ............ *B62D 55/084* (2013.01); *B62D 11/20* (2013.01); *B62D 13/00* (2013.01); *B62D 55/02* (2013.01); *B62D 55/116* (2013.01)

(58) Field of Classification Search
CPC ......... B62D 11/20; B62D 11/22; B62D 11/24; B62D 55/084; B62D 55/116
See application file for complete search history.

(56) References Cited

U.S. PATENT DOCUMENTS

| 3,035,654 A | 5/1962 | Nuttall, Jr. et al. |
| 4,579,182 A * | 4/1986 | Dewing ................. B62D 11/20 180/9.46 |

(Continued)

FOREIGN PATENT DOCUMENTS

| DE | 2949279 | 6/1981 |
| DE | 4102884 | 8/1992 |

(Continued)

OTHER PUBLICATIONS

U.S. Appl. No. 15/093,325, filed Apr. 7, 2016, Alihaider, Maniar.
(Continued)

*Primary Examiner* — Nicole T Verley
(74) *Attorney, Agent, or Firm* — Rebecca L. Henkel; Rickard K. DeMille

(57) ABSTRACT

An actuator assembly for an implement includes a pivot shaft configured to be received in a tubular member rigidly coupled to an implement frame, configured to pivot relative to the tubular member about a generally horizontal pitch axis, and configured to support a track assembly of the implement and to enable the track assembly to pivot about the generally horizontal pitch axis. The actuator assembly also includes an actuator anchor disposed on the pivot shaft. Further, the actuator assembly includes an actuator having a first longitudinal end and a second longitudinal end. The actuator is coupled to the actuator anchor at the first longitudinal end, and the actuator is configured to be coupled to a track assembly frame of the track assembly at the second longitudinal end. Moreover, the actuator is configured to extend and retract to pivotally steer the track assembly about a generally vertical steering axis.

20 Claims, 11 Drawing Sheets

(51) Int. Cl.
*B62D 11/20* (2006.01)
*B62D 13/00* (2006.01)
*B62D 55/02* (2006.01)

(56) References Cited

U.S. PATENT DOCUMENTS

| | | | |
|---|---|---|---|
| 4,771,851 A | 9/1988 | Nystuen et al. | |
| 5,191,952 A | 3/1993 | Satzler et al. | |
| 5,438,515 A | 8/1995 | Miichi et al. | |
| 5,533,587 A | 7/1996 | Dow et al. | |
| 5,590,977 A * | 1/1997 | Guntert | B62D 55/065 404/101 |
| 5,632,350 A | 5/1997 | Gauvin | |
| 5,964,814 A | 10/1999 | Muller et al. | |
| 6,145,609 A | 11/2000 | Hoelscher | |
| 6,164,399 A | 12/2000 | Bays | |
| 6,167,982 B1 | 1/2001 | Dillon | |
| 6,185,485 B1 | 2/2001 | Ashrafi et al. | |
| 6,810,975 B2 | 11/2004 | Nagorcka et al. | |
| 7,127,340 B2 | 10/2006 | Schick et al. | |
| 7,497,530 B2 | 3/2009 | Bessette | |
| 7,617,881 B2 | 11/2009 | Radke et al. | |
| 7,673,883 B2 | 3/2010 | Damm | |
| 7,694,993 B2 | 4/2010 | Timmons, Jr. | |
| 7,726,749 B2 | 6/2010 | Rosenboom | |
| 7,810,823 B2 | 10/2010 | Van Mill et al. | |
| 7,942,604 B2 * | 5/2011 | Willis | B62D 7/026 404/83 |
| 8,079,607 B2 | 12/2011 | Gaumer | |
| 8,342,255 B2 | 1/2013 | Connors et al. | |
| 8,428,831 B2 | 4/2013 | Thompson et al. | |
| 8,459,898 B2 * | 6/2013 | Guntert, Jr. | E01C 19/42 404/85 |
| 8,700,269 B2 | 4/2014 | Hubalek | |
| 8,727,047 B2 | 5/2014 | Janzen et al. | |
| 8,914,198 B2 | 12/2014 | Prickel et al. | |
| 9,096,264 B2 * | 8/2015 | Connors | A01B 69/003 |
| 9,193,385 B2 | 11/2015 | Svardby et al. | |
| 2006/0266151 A1 | 11/2006 | Avers et al. | |
| 2007/0240928 A1 * | 10/2007 | Coltson | B62D 7/1509 180/411 |
| 2009/0032273 A1 | 2/2009 | Hanh | |
| 2011/0175322 A1 | 7/2011 | McMahon et al. | |
| 2013/0181431 A1 * | 7/2013 | McMahon | B60D 1/247 280/839 |
| 2015/0014961 A1 | 1/2015 | Struyk | |
| 2015/0321708 A1 * | 11/2015 | Van Mill | B62D 55/305 280/28.5 |
| 2015/0367901 A1 * | 12/2015 | Studer | B62D 55/075 180/9.42 |
| 2016/0362149 A1 * | 12/2016 | Erlinger | B60G 1/04 |
| 2017/0043805 A1 | 2/2017 | Krammel | |

FOREIGN PATENT DOCUMENTS

| | | |
|---|---|---|
| DE | 202012103930 | 11/2012 |
| GB | 819266 | 9/1959 |

OTHER PUBLICATIONS

U.S. Appl. No. 15/093,085, filed Apr. 7, 2016, Marvin A. Prickel.

* cited by examiner

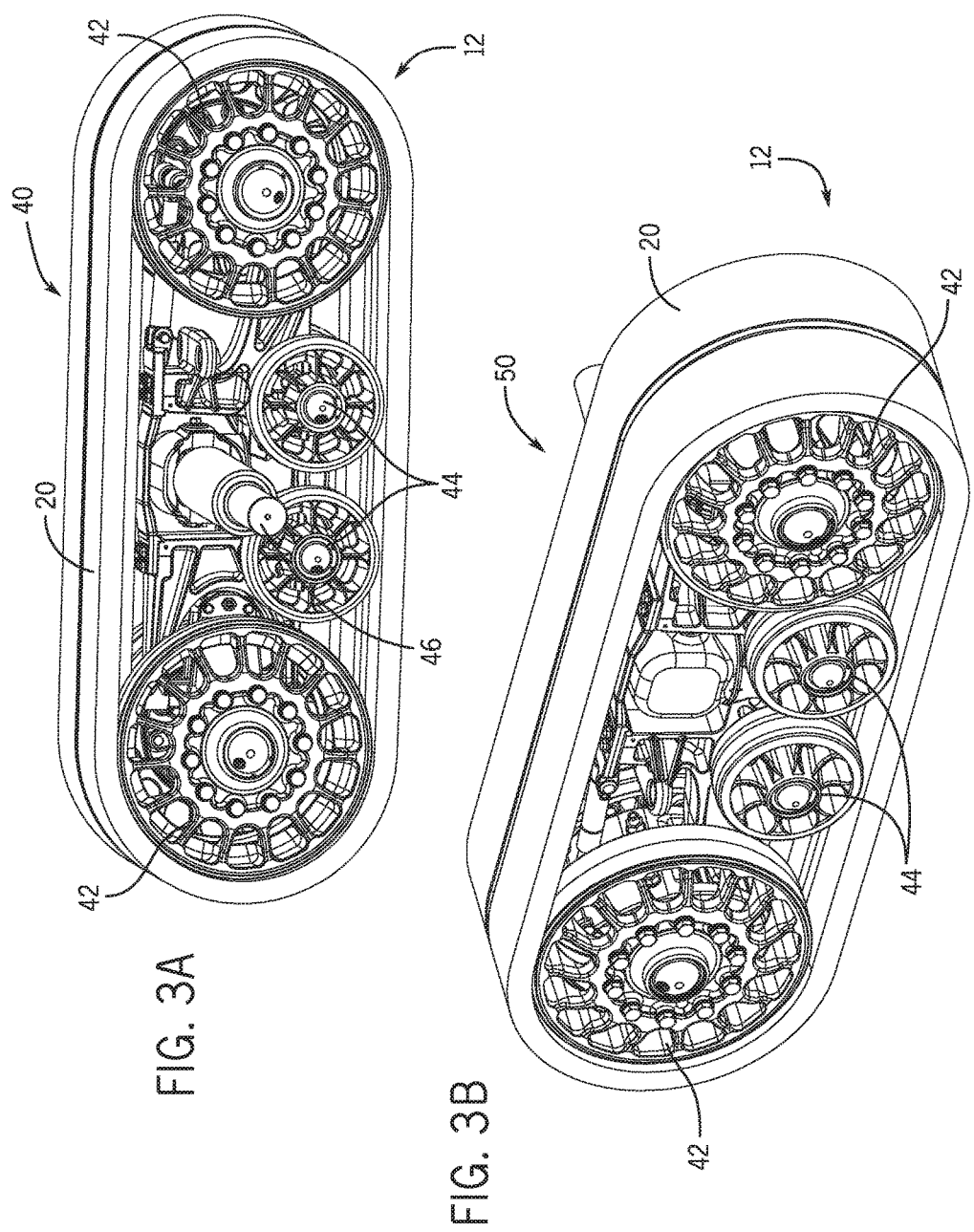

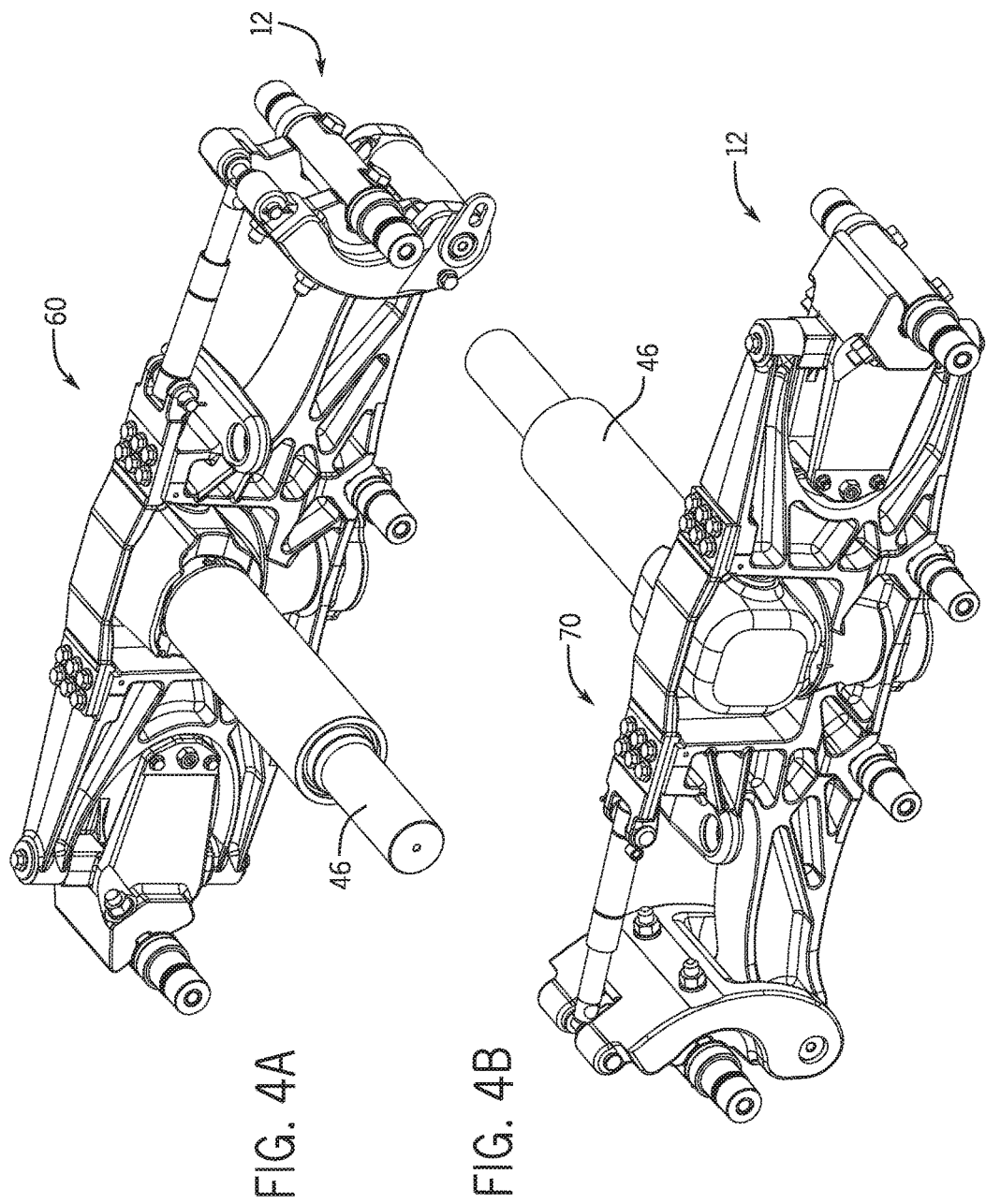

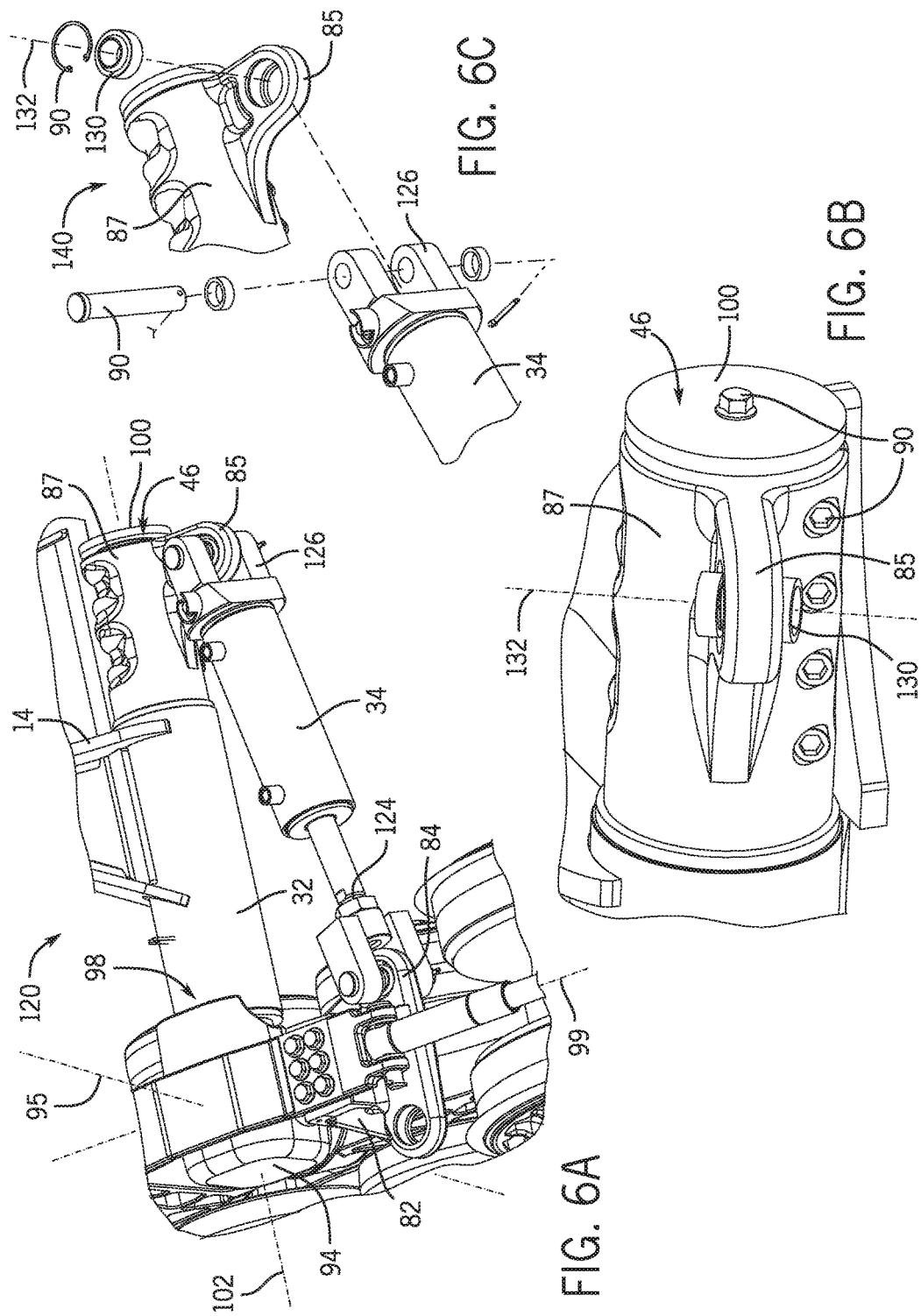

US 10,259,513 B2

IMPLEMENT STEERABLE TRACK ASSEMBLY WITH PIVOTING STEERING ACTUATOR

CROSS REFERENCE TO RELATED APPLICATIONS

This application is a continuation of U.S. patent application Ser. No. 15/093,094, entitled "IMPLEMENT STEERABLE TRACK ASSEMBLY WITH PIVOTING STEERING ACTUATOR," filed Apr. 7, 2016, which is herein incorporated by reference.

BACKGROUND

The present disclosure relates generally to work vehicles, such as agricultural implements. In particular, the present disclosure relates to a work vehicle with a track assembly that includes an actuator that enables steering and maintains a steering angle of the track assembly throughout the oscillation range of motion of the track assembly.

Track assemblies in work vehicles may use complex linkage systems in order for the track assemblies to rotate and steer as desired by an operator. Use of the complex linkage systems in the track assemblies may thus increase manufacturing and production costs and be detrimental in terms of reliability due to employing a number of moving components.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, an actuator assembly for an implement includes a pivot shaft configured to be received in a tubular member rigidly coupled to an implement frame. The pivot shaft is configured to pivot relative to the tubular member about a generally horizontal pitch axis. Additionally, the pivot shaft is configured to support a track assembly of the implement and to enable the track assembly to pivot about the generally horizontal pitch axis. The actuator assembly also includes an actuator anchor disposed on the pivot shaft. Further, the actuator assembly includes an actuator having a first longitudinal end and a second longitudinal end. The actuator is coupled to the actuator anchor at the first longitudinal end, and the actuator is configured to be coupled to a track assembly frame of the track assembly at the second longitudinal end. Moreover, the actuator is configured to extend and retract to pivotally steer the track assembly about a generally vertical steering axis.

In a second embodiment, an actuator assembly for an implement includes a pivot shaft configured to be received in a tubular member rigidly coupled to an implement frame. The pivot shaft is configured to pivot relative to the tubular member about a generally horizontal pitch axis. Additionally, the pivot shaft is configured to support a track assembly of the implement and to enable the track assembly to pivot about the generally horizontal pitch axis. The actuator assembly also includes an actuator anchor disposed on the pivot shaft. Further, the actuator assembly includes an actuator having a first longitudinal end and a second longitudinal end. The actuator is configured to be coupled to a track assembly frame of the implement at the second longitudinal end. Moreover, the actuator is configured to extend and retract to pivotally steer the track assembly about a generally vertical steering axis. The actuator assembly further includes a bearing assembly configured to couple the first longitudinal end of the actuator to the actuator anchor, and to facilitate rotation of the actuator about a longitudinal axis of the actuator relative to the actuator anchor.

In a third embodiment, an implement includes a track assembly having a track assembly frame. The implement also includes an implement frame and a tubular member rigidly coupled to the implement frame. Additionally, the implement includes a pivot shaft disposed in the tubular member. The pivot shaft is configured to pivot relative to the tubular member about a generally horizontal pitch axis, the pivot shaft is coupled to the track assembly, and the pivot shaft enables the track assembly to pivot about the generally horizontal pitch axis. The implement also includes an actuator anchor disposed on the pivot shaft and an actuator having a first longitudinal end and a second longitudinal end. The actuator is coupled to the track assembly frame at the second longitudinal end, and the actuator is configured to extend and retract to pivotally steer the track assembly about a generally vertical steering axis. Moreover, the implement includes a bearing assembly. The bearing assembly couples the first longitudinal end of the actuator to the actuator anchor, and facilitates rotation of the actuator about a longitudinal axis of the actuator relative to the actuator anchor.

DRAWINGS

These and other features, aspects, and advantages of the present invention will become better understood when the following detailed description is read with reference to the accompanying drawings in which like characters represent like parts throughout the drawings, wherein:

FIG. 3A is a diagram of the track assembly viewed from a first perspective, in accordance with an embodiment of the present disclosure;

FIG. 3B is a diagram of the track assembly viewed from a second perspective, in accordance with an embodiment of the present disclosure;

FIG. 4A is a diagram of the track assembly from FIG. 3A, with the track and wheels removed, in accordance with an embodiment of the present disclosure;

FIG. 4B is a diagram of the track assembly from FIG. 3B, with the track and wheels removed, in accordance with an embodiment of the present disclosure;

FIG. 6A is a diagram of steering components of the track assembly from FIG. 2, in accordance with an embodiment of the present disclosure;

FIG. 6B is a diagram of steering components of the track assembly from FIG. 2, in accordance with an embodiment of the present disclosure;

FIG. 6C is an exploded view of steering components of the track assembly from FIG. 2, in accordance with an embodiment of the present disclosure;

Figure 2:
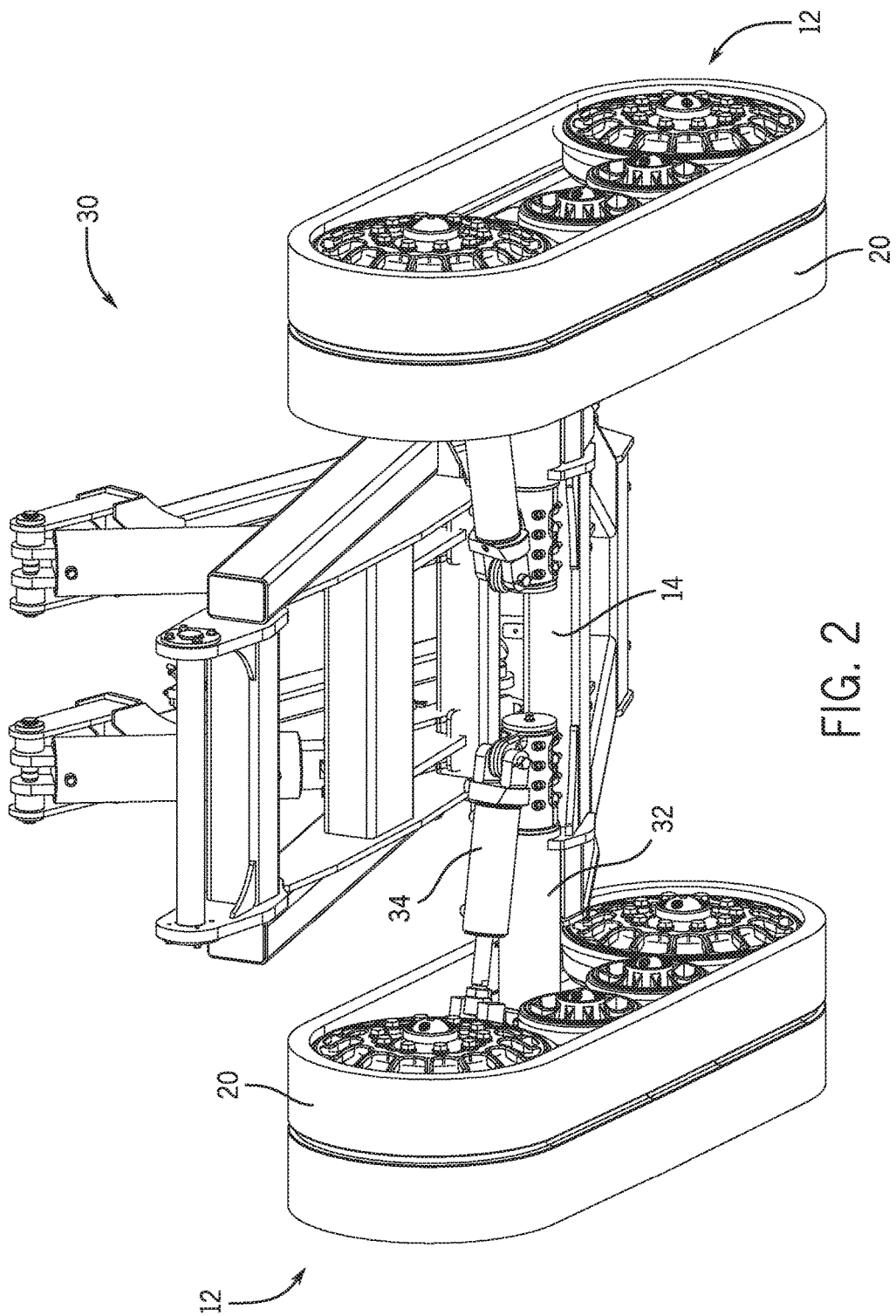
FIG. 2 is a diagram of a main weight carrying structure of the work vehicle that includes the track assembly, in accordance with an embodiment of the present disclosure.
Figure 9A:
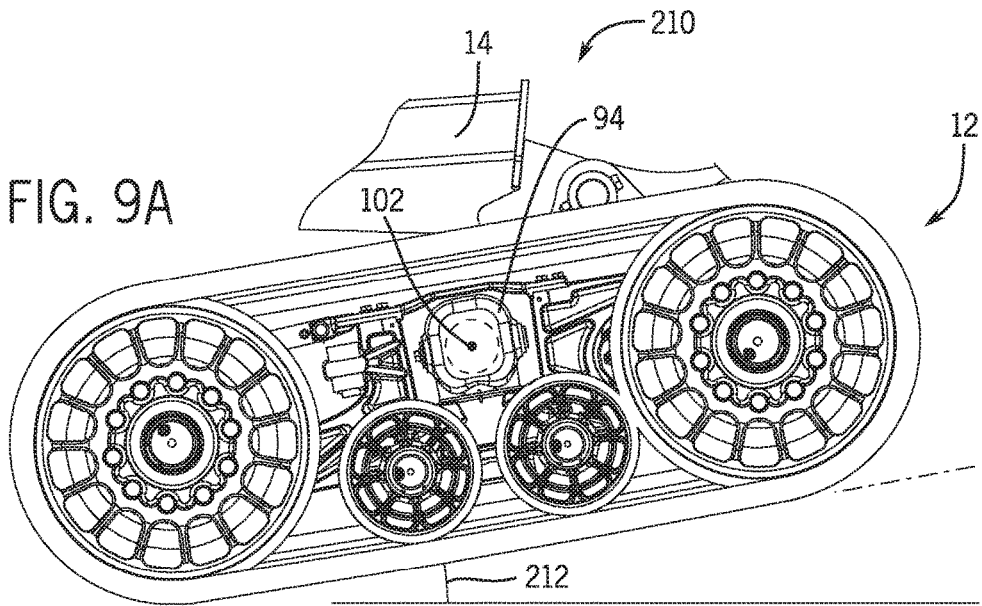
Figure 9B:
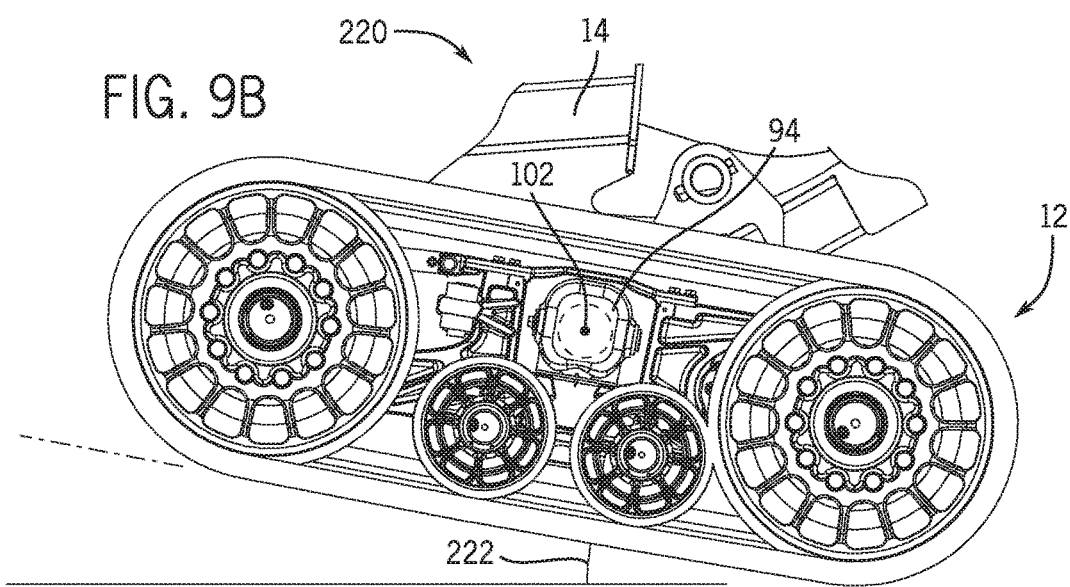

FIG. 9A is a diagram of the main weight carrying structure of the work vehicle from FIG. 2, showing a left view of a track assembly tilted downward, in accordance with an embodiment of the present disclosure; and FIG. 9B is a diagram of the main weight carrying structure of the work vehicle from FIG. 2, showing a left view of a track assembly tilted upward, in accordance with an embodiment of the present disclosure.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to work vehicles, such as agricultural implements. It may be desirable to reduce or eliminate the complex linkages used in track assemblies of the work vehicles in order to reduce manufacturing and production costs and increase reliability of the track assemblies. Accordingly, systems and methods are disclosed in which a work vehicle includes a track assembly that permits pivotal steering movement, pivotal pitch movement, and pivotal camber movement, wherein one end of an actuator is coupled to the track assembly while an opposite end of the actuator is anchored via a self-aligning bearing arrangement that transmit steering forces while enabling pivotal movement of the track assembly. As such, the use of complex linkages in the track assembly may be reduced or eliminated altogether. In particular, one embodiment of the present disclosure includes a work vehicle includes left and right track assemblies, each track assembly including a main frame, a pivot member, a pivot shaft coupled to the pivot member, and an actuator coupled between the pivot shaft and the main frame. Each track assembly is configured to permit pivotal steering movement, pivotal pitch movement, and pivotal camber movement. The actuator of each track assembly is coupled to the respective main frame at one end of the actuator, and at an opposite end of the actuator to an actuator anchor via a self-aligning bearing arrangement to permit transmission of steering forces while enabling pivotal movement of the respective track assembly.

Figure 1:
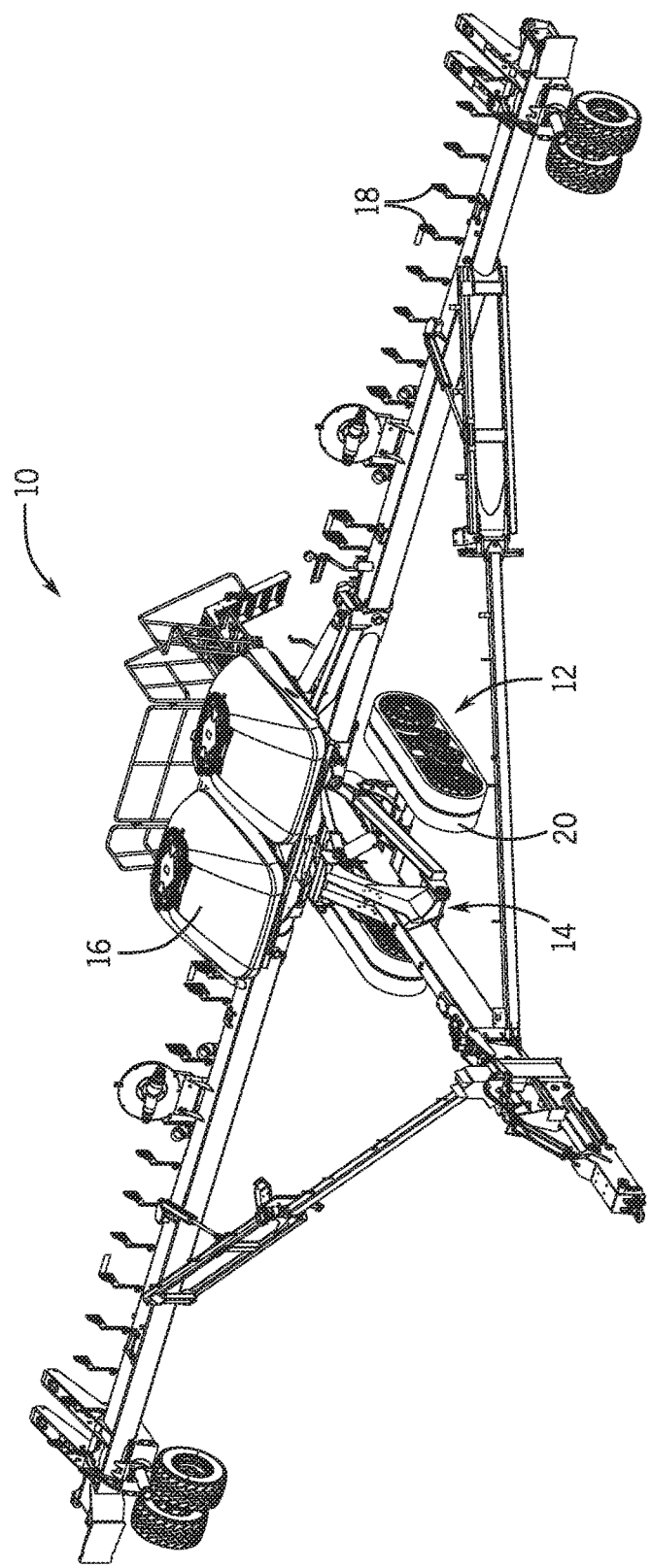
FIG. 1 is a diagram of a work vehicle with a steerable track assembly, in accordance with an embodiment of the present disclosure.

FIG. 1 is a diagram of a work vehicle or agricultural implement 10 with a steerable track assembly 12, in accordance with an embodiment of the present disclosure. The agricultural implement 10 may be any suitable type of agricultural implement, such as a cultivator, planter, fertilizer applicator, harvester, etc. The agricultural implement 10 includes a frame 14 to which components of the agricultural implement 10 may be attached, such as the track assembly 12. For example, storage tanks 16 that may contain agricultural product, such as seeds, fertilizer, etc., may be attached to the frame 14. Row units 18 that may be used to cultivate soil, plant seeds, fertilize a field, spread the agricultural product, etc., may also be attached to the frame 14. The frame 14 may be configured to enable the agricultural implement 10 to be towed by an agricultural vehicle, such as a tractor or floater. The track assembly 12 includes a track or track belt 20 that enable the agricultural implement 10 to travel on a variety of terrains. It should be noted that although the vehicle shown and described here is not driven (that is, in most cases will be towed), nothing in the disclosure should be understood as limiting the technology described to such vehicles, but these same or similar techniques may be employed for driven or driving vehicles. Similarly, although an agricultural implement is shown and described, the present disclosure is not limited to agricultural settings, but may be used on other vehicles, such as construction vehicles, military vehicles, and so forth.

FIG. 2 is a diagram of a main weight carrying structure 30 of the agricultural implement 10 that includes the track assembly 12, in accordance with an embodiment of the present disclosure. As illustrated, the frame 14 is attached to left and right track assemblies 12. Tubular member 32 may be fixed to (e.g., welded to) the frame 14 of the agricultural implement 10 and may couple to a respective track assembly 12. As illustrated, actuators or steering cylinders 34 are configured to extend and retract to pivotally steer the respective track assembly 12 about a generally vertical axis (e.g., about a generally vertical steering axis).

FIG. 3A is a diagram of the track assembly 12 viewed from a first perspective 40, in accordance with an embodiment of the present disclosure. In particular, the first perspective 40 may be from between left and right track assemblies of FIG. 2 such that an inner side of the track assembly 12 is viewed. As illustrated, the track assembly 12 includes front and rear idler wheels 42 and two intermediate roller wheels 44. In some embodiments, the track assembly 12 may include any number of roller wheels 44, such as one, three, four, or no roller wheels 44. The track assembly 12 also includes a pivot shaft 46 that enables the track assembly 12 to pivot in several directions as discussed below.

FIG. 3B is a diagram of the track assembly 12 viewed from a second perspective 50, in accordance with an embodiment of the present disclosure. In particular, the second perspective 50 may be from a side of the agricultural implement such that an outer side of the track assembly 12 is viewed.

FIG. 4A is a diagram of the track assembly 12 from FIG. 3A, with the track 20 and wheels removed, viewed from a first perspective 60, in accordance with an embodiment of the present disclosure. In particular, the first perspective 60 may be from between left and right track assemblies 12 of FIG. 2 such that an inner side of the track assembly is viewed.

FIG. 4B is a diagram of the track assembly 12 from FIG. 3B, with the track 20 and wheels removed, viewed from a second perspective 70, in accordance with an embodiment of the present disclosure. In particular, the second perspective 70 may be from a side of the agricultural implement such that an outer side of the track assembly 12 is viewed.

Figure 5A:
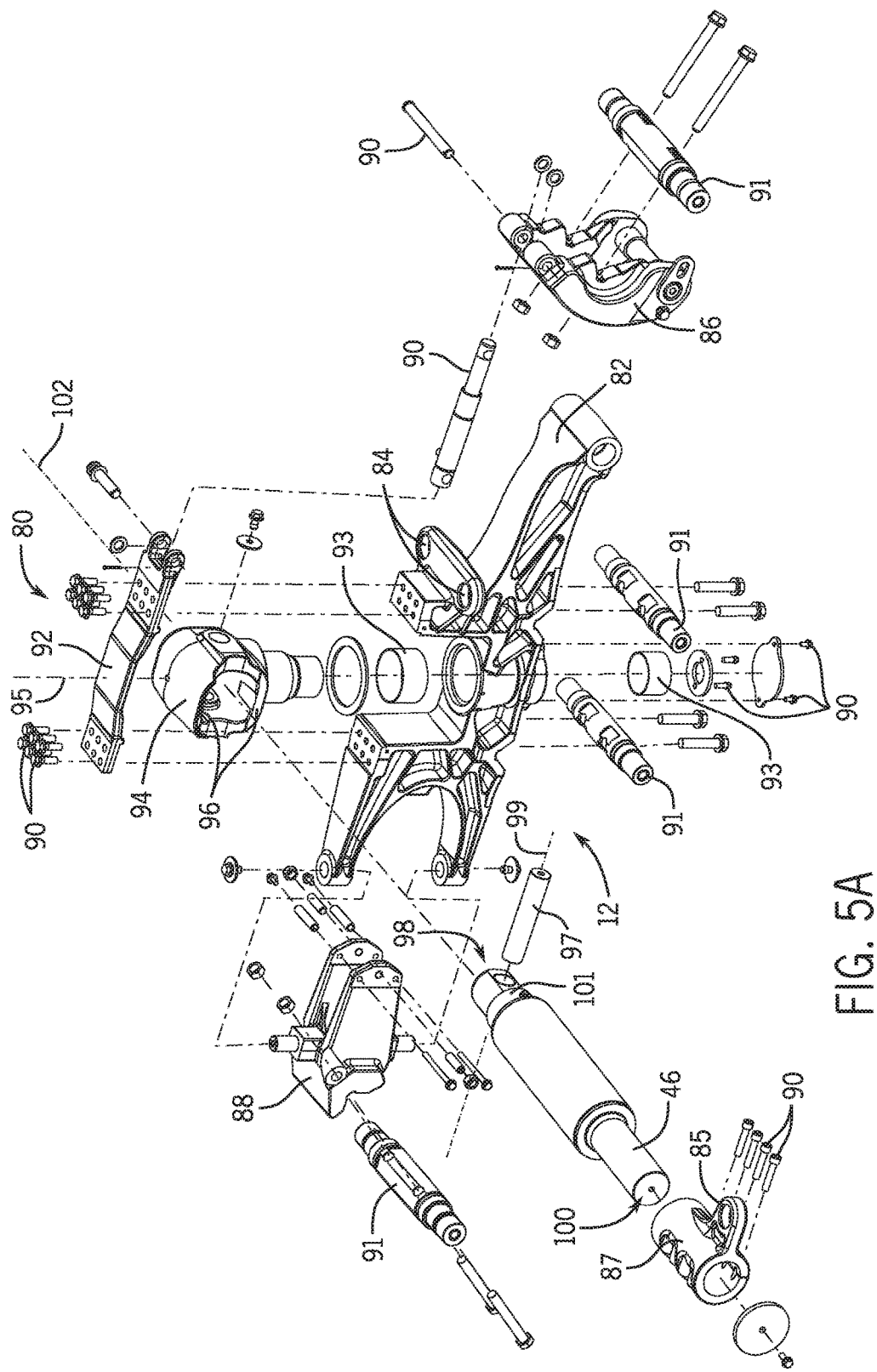
FIG. 5A is an exploded view of the track assembly from FIG. 4A, in accordance with an embodiment of the present disclosure.

FIG. 5A is an exploded view 80 of the track assembly 12 from FIG. 4A, in accordance with an embodiment of the present disclosure. As illustrated, the track assembly 12 includes a main frame or casting 82 that is configured to enable steering of the track assembly 12 via the pivot shaft 46 and the actuator. In particular, the actuator may couple to the main frame 82 at a steering mount 84 and a cap end of the actuator may couple to a tang 85 of an actuator or steer cylinder anchor 87. The actuator may thus be pivotal with the pivot shaft 46. The pivot member 46 is mounted to a respective main frame 82 to permit pivotal steering movement about a generally vertical steering axis for steering each track assembly 12 under the influence of the actuator. The tang 85 may act as a retention device in relation to the actuator while the actuator anchor 87 serves as a mounting anchor for both the pivot shaft 46 and the actuator. In some embodiments, the respective main frame 82 of each track assembly 12 of the agricultural implement includes generally symmetrically placed securement locations for each respective actuator to permit use of the same main frame 82 on either the left or the right track assembly. For example, as illustrated, the main frame 82 includes two steering mounts 84. When mounted, the inside steering mount 84 may be used to couple to the actuator while the outside steering mount 84 remains unused. As such, the main frames 82 for the left and right track assemblies (as seen in FIG. 2, for example) may be identical. In this manner, manufacturing and production of the main frames 82 may be simplified and made more efficient by eliminating reconfiguration of manufacturing and production facilities in order to make two different main frames. Thus, in some embodiments, the left and right track assemblies 12 are mirror images of one another. That is, the main frame 82, a pivot member 94, the pivot shaft 46, the actuator, actuator anchor 87, or any combination thereof, are identical in both the left and right track assemblies.

As illustrated, the main frame 82 is coupled to first and second castings configured to couple to the idler wheels 42. In particular, the main frame 82 may be coupled to a front idler tensioning casting 86 that is configured to couple to a front idler wheel 42. The main frame 82 may also be coupled to a rear idler belt tracking casting 88 that is configured to couple to a rear idler wheel 42. Any suitable fastener 90 and suitable number of fasteners 90 may be used to couple the front idler tensioning casting 86 and the rear idler belt tracking casting 88 to the main frame 82. The fasteners 90 may also include any bushings or bearings that enable generally pivotal movement. For example, the fasteners 90 may include bushings, bearings, washers, retention caps, cover plates, bolts, nuts, screws, retaining caps, etc. The main frame 82 may also be coupled to axles 91, configured for mounting the idler wheels 42 or roller wheels 44.

As illustrated, the main frame 82 is also coupled to a top support plate or track guide 92. In particular, the main frame 82 may be coupled to the track guide 92 that may be configured to support the main frame 82 and guide the track. As illustrated, the track guide 92 may couple to the front idler tensioning casting 86 to support operation of the front idler wheel 42. The track guide 92 may couple to the main frame 82 via one or more fasteners 90. The track guide 92 may be disposed over the respective pivot member or casting 94 and, in operation, at least partially support the continuous track 20 of the respective track assembly 12.

Each pivot member 94 may be pivotally received in a recess of the respective main frame 82. In some embodiments, the track guide 92 may be configured to maintain the coupling of the pivot member 94 and the main frame 82. As illustrated, the pivot member 94 is coupled to the main frame 82 via sleeve bearings 93 and fasteners 90. The sleeve bearings 93 enable the pivot member 94 to pivot about a generally vertical steering axis (e.g., yaw) 95 when coupled to the main frame 82. Additionally, the pivot member 94 is configured to couple to the pivot shaft 46 via a horizontal oscillation pin 97. As illustrated, the pivot member 94 is configured to couple to an outer end 98 of the pivot shaft 46 via the horizontal oscillation pin 97, such that there is space between the pivot shaft 46 and the pivot member 94 (at least above and below the pivot shaft 46). In this manner, the pivot shaft 46 is configured to pivot about a generally horizontal camber axis 99 when coupled to the pivot member 94 via the horizontal oscillation pin 97. As such, each respective track assembly 12 and each respective main frame 82 of each respective track assembly 12 may be pivotal about the generally horizontal camber axis (e.g., roll) through a portion of the respective pivot member 94 to permit camber movement of the respective track assembly 12. In some embodiments, the pivot member 94 may be configured to guide the pivoting motion of the pivot shaft 46. For example, the pivot member 94 may include extended top and/or bottom portions 96 that restrict the pivot roll rotation through axis 99 from pivoting beyond a maximum pivoting angle (e.g., one to 90 degrees, two to 45 degrees, three to 30 degrees, etc.) via contact limitation with wear sleeve 101 fastened to the pivot shaft 46. In this manner, the pivot member 94 may protect and increase the lifetime of the components of the track assembly 12 by reducing and/or eliminating undesirable contact with the frame of the agricultural implement while the track assembly 12 is pivoting and in operation.

The pivot shaft 46 may be configured to be received in the tubular member of the frame of the agricultural implement 10. The pivot shaft 46 may support the respective actuator mounting on a side of the tubular member opposite the respective pivot member 94. As illustrated, an inner end 100 of the pivot shaft 46 is configured to couple to the actuator anchor 87 via one or more fasteners 90. The actuator anchor 87 may be configured to maintain the pivot shaft 46 in the tubular member. In this manner, the pivot shaft 46 is configured to pivot about a generally horizontal pitch axis 102 when received in the tubular member of the frame 14

Figure 5B:
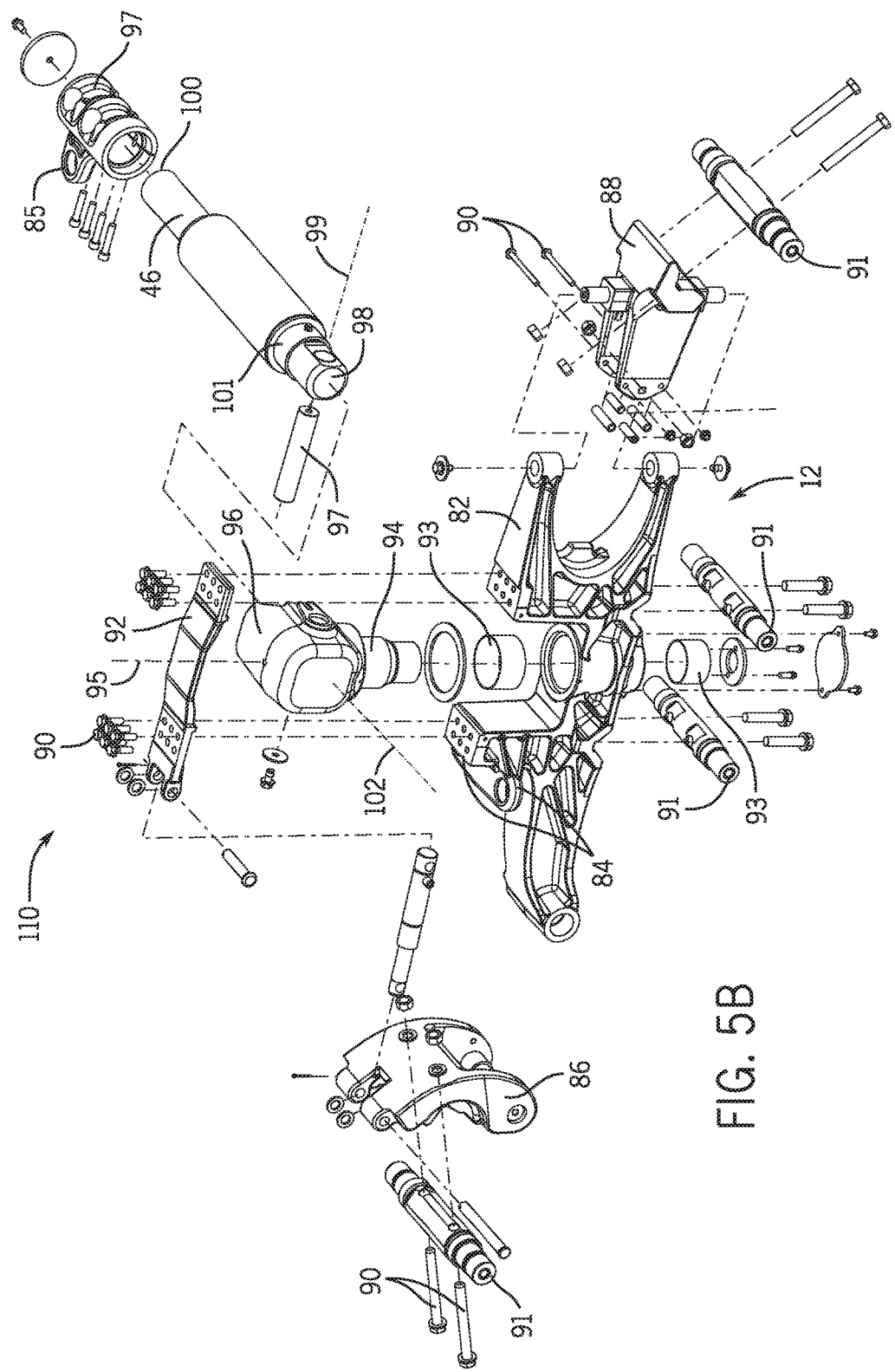
FIG. 5B is an exploded view of the track assembly from FIG. 4B, in accordance with an embodiment of the present disclosure.

(and anchored by the actuator anchor 87). As such, the respective track assembly 12 may be pivotal about the generally horizontal pitch axis 102 of the respective pivot shaft 46 to permit pitch movement of the respective track assembly 12. FIG. 5B is a diagram of an exploded view 110 of the track assembly 12 from FIG. 4B, in accordance with an embodiment of the present disclosure.

FIG. 6A is a diagram of steering components 120 of the track assembly from FIG. 2, in accordance with an embodiment of the present disclosure. As illustrated, the track assembly is configured to enable steering of the agricultural implement about the generally vertical steering axis 95 via the pivot member 94 and the actuator 34. The pivot shaft 46 is configured to be received in the tubular member 32 of the frame 14 of the agricultural implement. The tubular member 32 may be welded to the frame 14, such that the tubular member 32 remains fixed in relation to the frame 14 as the track assembly is pivoted about the generally vertical steering axis 95 to provide steering of the agricultural implement. The outer end 98 of the pivot shaft 46 may be coupled to the pivot member 94 via the horizontal oscillation pin, as shown in more detail in FIG. 5B, and enable the pivot shaft 46 to pivot about a generally horizontal camber axis. The inner end 100 of the pivot shaft 46 may be coupled to the actuator anchor 87 via one or more fasteners, such that the pivot shaft 46 is maintained in the tubular member 32. As illustrated, the tubular member 32 is configured to enable the pivot shaft 46 to rotate about a generally horizontal pitch axis 102 freely.

The actuator 34 may be configured to extend and retract to steer the respective track assembly 12 about the generally vertical steering axis 95 to enable steering of the agricultural implement. In particular, a rod end 124 of the actuator 34 may couple to the main frame 82 at a steering mount 84 via one or more fasteners and a cap end 126 of the actuator 34 may couple to the tang 85 of the actuator anchor 87 via one or more fasteners. In some embodiments, the actuators 34 of each track assembly are identical hydraulic cylinders, wherein a rod end 124 of each hydraulic cylinder is secured to the respective main frame 82, and a cap end 126 of each hydraulic cylinder is secured to the respective actuator anchor 87. As such, the pivot member 94, mounted to the main frame 82, may permit pivotal steering movement about the generally vertical steering axis 95 for steering the respective track assembly 12 under the influence of the actuator 34. In some embodiments, the actuators are electrical linear actuators.

FIG. 6B is a diagram of the actuator anchor 87 mounted on the inner end 100 of the pivot shaft 46 of the track assembly from FIG. 2, in accordance with an embodiment of the present disclosure. As illustrated, one or more fasteners 90 (e.g., M16 cap screws, thrust washers, retaining caps) are used to mount the actuator anchor 87 on the inner end 100 of the pivot shaft 46. As illustrated, the actuator anchor 87 is split, fitted around the respective pivot shaft 46, and secured to the pivot shaft 46 by the one or more fasteners 90 that at least partially close the split. The actuator anchor 87 includes a self-aligning bearing or bushing arrangement 130 disposed in the tang 85 configured to mount the cap end of the actuator. The self-aligning bearing arrangement 130 may include spherical bushings and/or bearings that enable one or more pins (e.g., actuator retention pins), bolts, rods, etc. to rotate to an angle corresponding to the track assembly. As illustrated, the self-aligning bearing arrangement 130 includes a bushing fitted into an aperture on the cap end of the respective actuator. As such, the self-aligning bearing 130 mounts the respective actuator to move about a generally vertical axis 132 for exertion of the steering forces, and permits a degree of angular displacement of the generally vertical axis 132. In this manner, the actuator anchor 87 may support pivotal movement of the pivot shaft 46 about the generally horizontal camber axis. The self-aligning bearing 130 may permit transmission of steering forces while enabling pivotal movement of the respective track assembly. Thus, mounting the rod end of the respective actuator to the main frame and the cap end of the respective actuator to the actuator anchor 87 via the self-aligning bearing 130 enables the respective track assembly to pivot about the generally vertical steering axis, the generally horizontal pitch axis, and the generally horizontal camber axis, and enables maintaining a steering angle throughout the oscillation range of motion of the track assembly. As a result, the use of complex linkages in track assemblies of agricultural implements may be reduced or eliminated. Advantageously, manufacturing and production costs may be reduced and the number of moving parts of the agricultural implement may be reduced, resulting in increased reliability.

FIG. 6C is an exploded view 140 of a coupling of the actuator anchor 87 and the actuator 34 of the track assembly from FIG. 2, in accordance with an embodiment of the present disclosure. As better shown, the self-aligning bearing 130 couples the cap end 126 of the actuator 34 to the tang 85 of the actuator anchor 87 via one or more fasteners 90. As illustrated, the self-aligning bearing 130 is configured to enable the actuator 34 to pivot about the generally vertical axis 132, but also to permit a degree of angular displacement of the generally vertical axis 132.

Figure 7A:
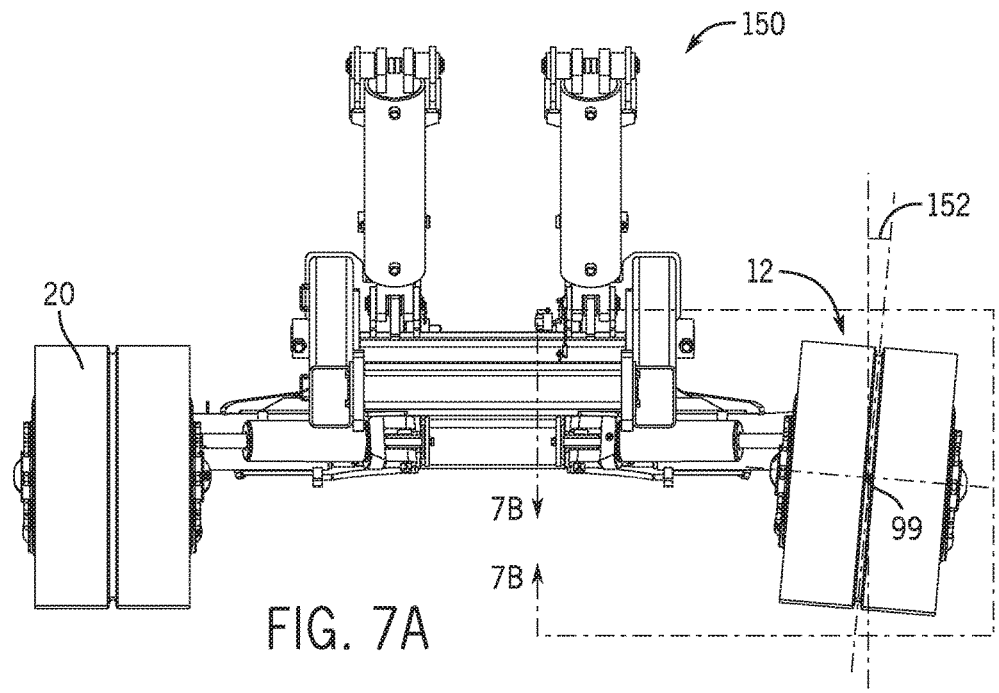
FIG. 7A is a diagram of the main weight carrying structure of the work vehicle from FIG. 2, showing a track assembly at an inward camber angle, in accordance with an embodiment of the present disclosure.

FIG. 7A is a diagram of the main weight carrying structure 150 of the agricultural implement from FIG. 2, showing a left track assembly 12 at an inward camber angle 152, in accordance with an embodiment of the present disclosure. The left track assembly 12 is cambered at the inward camber angle 152 in relation to the generally horizontal camber axis 99, enabled by the pivot shaft coupling to the pivot member via the horizontal oscillation pin.

Figure 7B:
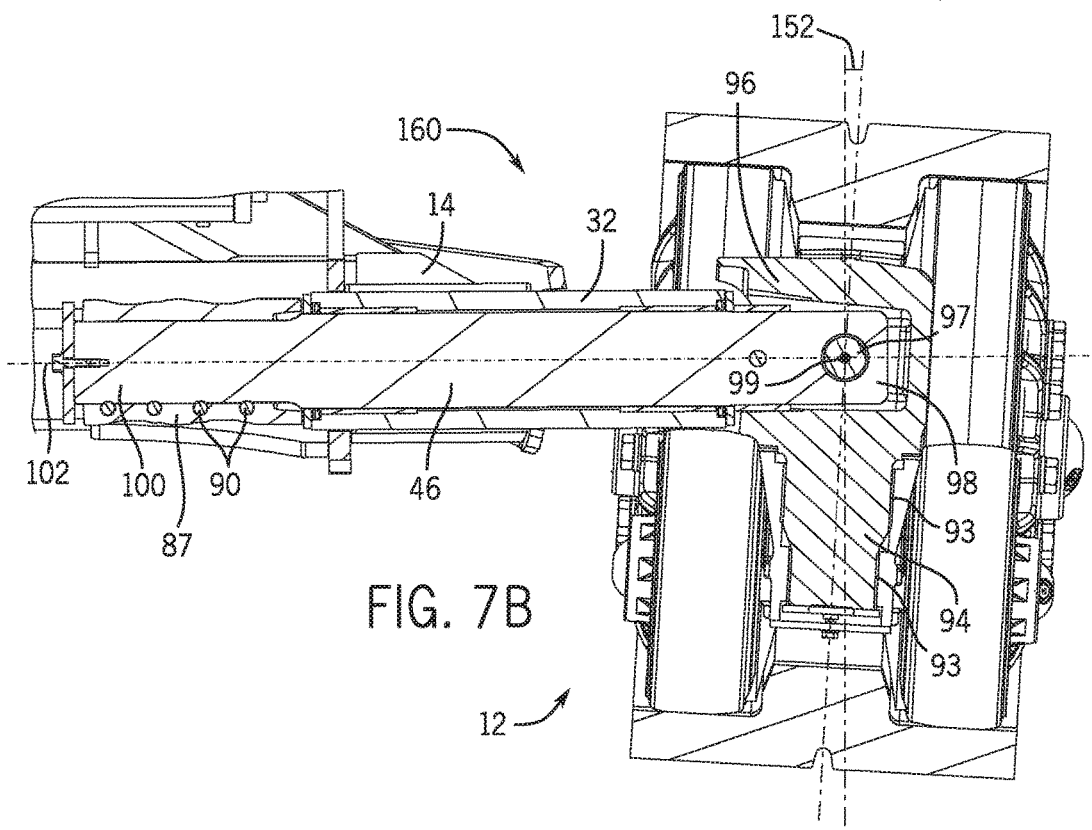
FIG. 7B is a cross-sectional view of the main weight carrying structure of the work vehicle from FIG. 7A, showing the track assembly at an inward camber angle, in accordance with an embodiment of the present disclosure.

FIG. 7B is a cross-sectional view of the main weight carrying structure 160 of the agricultural implement from FIG. 7A, showing the track assembly 12 at the inward camber angle 152, in accordance with an embodiment of the present disclosure. As discussed earlier, the pivot shaft 46 of the track assembly 12 is disposed in the tubular member 32 of the frame 14 of the agricultural implement. The tubular member 32 remains fixed in relation to the frame 14 as the pivot shaft 46 pivots within the tubular member 32 about the generally horizontal pitch axis 102. The inner end 100 of the pivot shaft 46 may be coupled to the actuator anchor 87 via one or more fasteners 90, such that the pivot shaft 46 is maintained in the tubular member 32. The outer end 98 of the pivot shaft 46 may be coupled to the pivot member 94 via the horizontal oscillation pin 97 and enable the track assembly 12 to pivot about the generally horizontal camber axis 99 via pivot member 94. As shown, the pivot member 94 includes extended top and/or bottom portions 96 that restrict the pivot member 94 from pivoting beyond a maximum pivoting angle. In practice, the track assembly 12 may be urged into the inward camber angle 152 due to uneven terrain of a field traveled on by the agricultural implement 10.

Figure 7C:
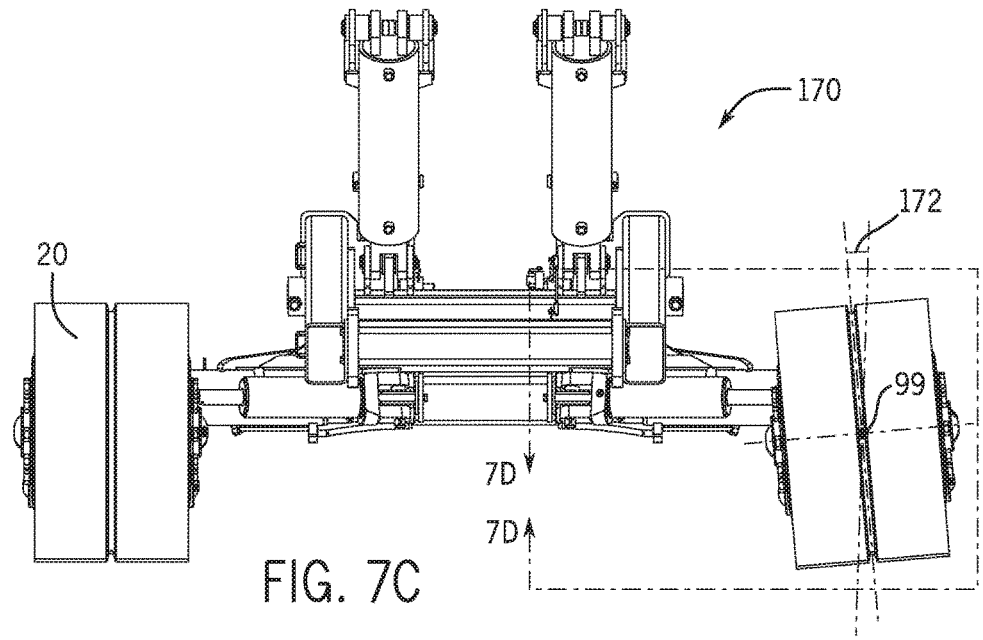
FIG. 7C is a diagram of the main weight carrying structure of the work vehicle from FIG. 2, showing the track assembly at an outward camber angle, in accordance with an embodiment of the present disclosure.

FIG. 7C is a diagram of the main weight carrying structure 170 of the agricultural implement 10 from FIG. 2, showing the left track assembly 12 at an outward camber angle 172, in accordance with an embodiment of the present disclosure. The right track assembly 12 is cambered at the outward camber angle 172 about the generally horizontal camber axis 99, enabled by the pivot shaft coupling to the pivot member via the horizontal oscillation pin 97.

Figure 7D:
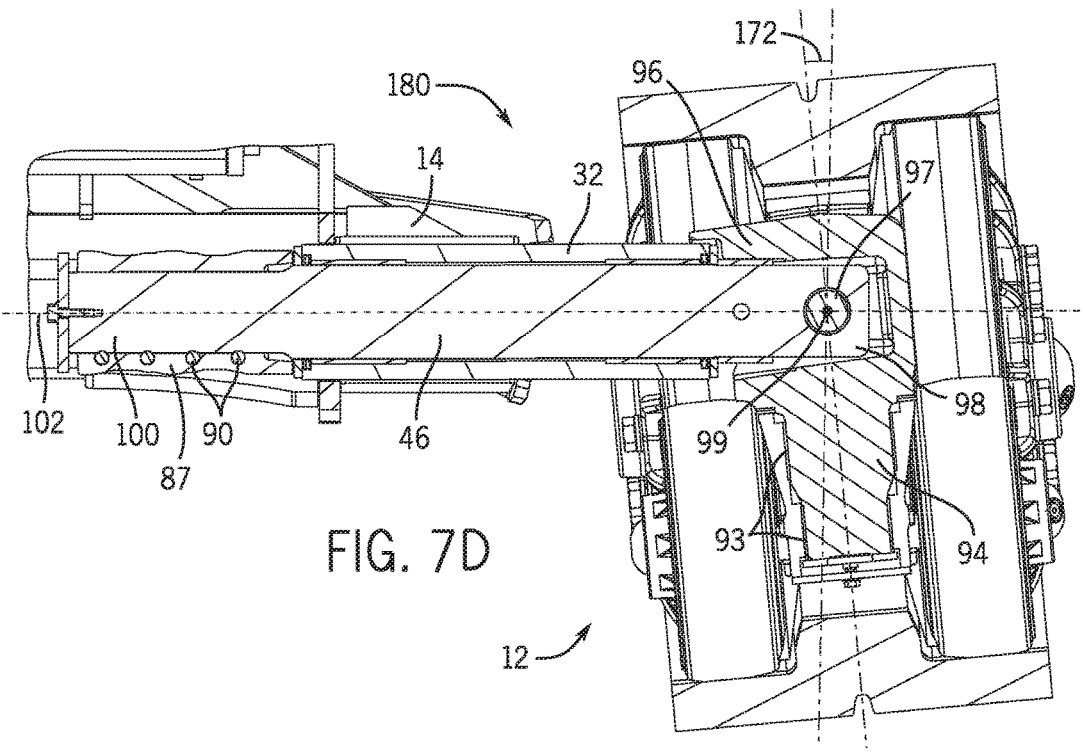
FIG. 7D is a cross-sectional view of the main weight carrying structure of the work vehicle from FIG. 7C, showing the track assembly at an outward camber angle, in accordance with an embodiment of the present disclosure.

FIG. 7D is a cross-sectional view of the main weight carrying structure 180 of the agricultural implement from FIG. 7C, showing the track assembly 12 at the outward camber angle 172, in accordance with an embodiment of the present disclosure. In practice, the track assembly 12 may be urged into the outward camber angle 172 due to uneven terrain of a field traveled on by the agricultural implement. As illustrated, the left and right track assemblies 12 may be configured to be independently positioned at different camber angles.

Advantageously, the ability of the track assembly 12 to pivot about the generally horizontal camber axis 99 may enable the track assembly 12 to increase or maximize surface area contact of the track 20 to the terrain. As a result, load distribution of the agricultural implement on the terrain may be increased. As such, disturbing planted soil may be avoided and compacting the soil when traveling may be reduced. Increased surface contact with the terrain may also reduce heat generation and thus increase the lifespan of the track. In some embodiments, the wheels of the track assembly 12 are not powered in operation. In alternative embodiments, a motor may be used in conjunction with the track assemblies 12. Increasing surface contact with the terrain may realize faster vehicle speeds.

Figure 8A:
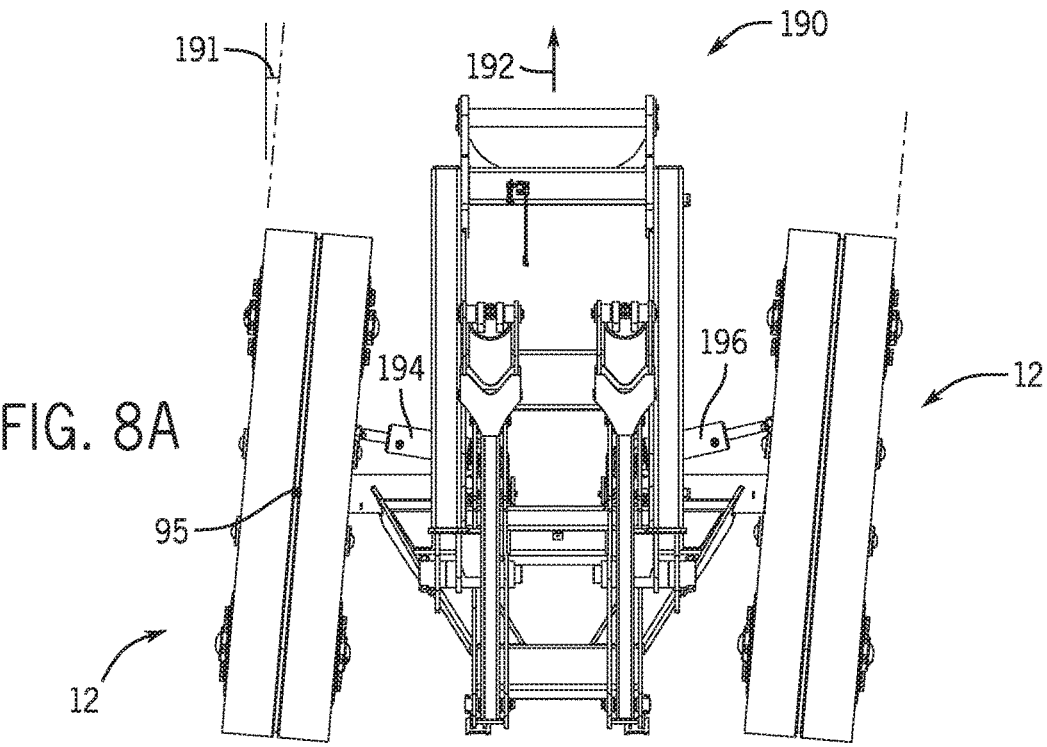
FIG. 8A is a bird's-eye view of the main weight carrying structure of the work vehicle from FIG. 2, showing the track assembly configured to turn right, in accordance with an embodiment of the present disclosure.

FIG. 8A is a bird's-eye view of the main weight carrying structure on 190 of the agricultural implement 10 from FIG. 2, showing the track assemblies 12 configured to turn right at a steering angle 191, in accordance with an embodiment of the present disclosure. The left and right track assemblies 12 are angled such that the agricultural implement 10 turns right at the steering angle 191 when moving in a forward direction 192. In particular, a left actuator 194 may be in a contracted configuration while a right actuator 196 may be in an extended configuration, enabling the agricultural implement to turn right at the steering angle 191. The ability of the left and right track assemblies 12 to turn is enabled by the coupling of the respective pivot members to the main frames of the respective track assemblies 12. As such, the left and right track assemblies 12 are enabled to pivot about the generally vertical steering axis 95. The left and right track assemblies 12 may be configured to work in conjunction with one another when turning. For example, when an operator desires for the agricultural implement to make a ten degree right turn, the left and right track assemblies 12 may be configured to each make a right turn at ten degrees.

Figure 8B:
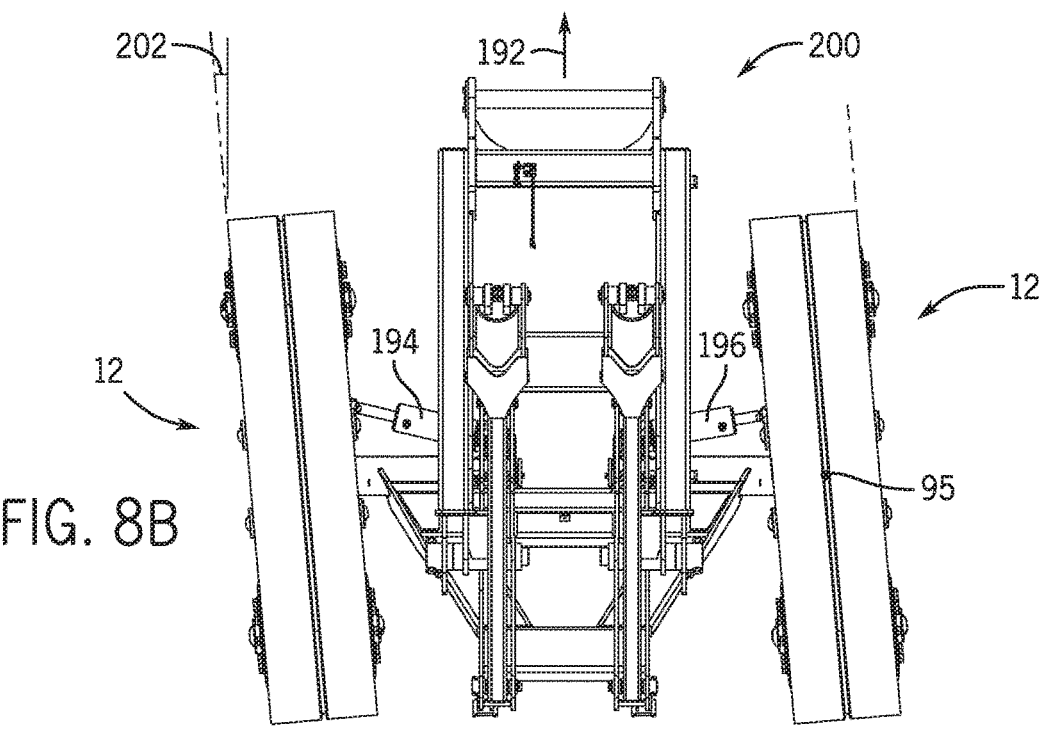
FIG. 8B is a bird's-eye view of the main weight carrying structure of the work vehicle from FIG. 2, showing the track assembly configured to turn left, in accordance with an embodiment of the present disclosure.

FIG. 8B is a bird's-eye view of the main weight carrying structure 200 of the agricultural implement 10 from FIG. 2, showing the track assembly 12 configured to turn left at a steering angle 202, in accordance with an embodiment of the present disclosure. The left and right track assemblies 12 are angled such that the agricultural implement turns left at the steering angle 202 when moving in the forward direction 192. In particular, the left actuator 194 may be in an extended configuration while the right actuator 196 may be in a contracted configuration, enabling the agricultural implement to turn left at the steering angle 202. The entire range of the left and right track assemblies 12 to turn left and right may be dependent on at least one of the specifications of the actuators 194, 196, the frame of the agricultural implement, the main frames of the track assemblies 12, etc.

FIG. 9A is a diagram of the main weight carrying structure 210 of the agricultural implement 10 from FIG. 2, showing a left view of a track assembly 12 tilted at a downward pitch angle 212, in accordance with an embodiment of the present disclosure. The ability of the track assembly 12 to tilt at the downward pitch angle 212 is enabled by the pivot shaft disposed within the tubular member of the frame 14 of the agricultural implement, wherein the outer end of the pivot shaft is coupled to the pivot member 94 and the inner end of the pivot shaft is coupled to the actuator anchor. As such, the assembly 12 is enabled to pivot about the generally horizontal pitch axis 102. In practice, the track assembly 12 may be urged into the downward pitch angle 212 position due to uneven terrain of a field traveled on by the agricultural implement.

FIG. 9B is a diagram of the main weight carrying structure 220 of the agricultural implement 10 from FIG. 2, showing a left view of a track assembly 12 tilted at an upward pitch angle 222, in accordance with an embodiment of the present disclosure. In practice, the track assembly 12 may be urged into the upward pitch angle 222 due to uneven terrain of a field traveled on by the agricultural implement. It should be noted that the left and right track assemblies 12 may be configured to be independently positioned at different pitch angles. Enabling the left and right track assemblies 12 to tilt upward and downward about the generally horizontal pitch axis 102 may result in increased surface contact and increased load distribution of the left and track assemblies 12 with the terrain traveled upon by the agricultural implement.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An actuator assembly for an implement comprising:
    a pivot shaft configured to be received in a tubular member rigidly coupled to an implement frame, wherein the pivot shaft is configured to pivot relative to the tubular member about a generally horizontal pitch axis, the pivot shaft is configured to support a track assembly of the implement, and the pivot shaft is configured to enable the track assembly to pivot about the generally horizontal pitch axis;
    an actuator anchor disposed on the pivot shaft; and
    an actuator having a first longitudinal end and a second longitudinal end, wherein the actuator is coupled to the actuator anchor at the first longitudinal end, wherein the actuator is configured to be coupled to a track assembly frame of the track assembly at the second longitudinal end, and the actuator is configured to extend and retract to pivotally steer the track assembly about a generally vertical steering axis.

2. The actuator assembly of claim 1, wherein the actuator comprises a first connector at the first longitudinal end, and the first longitudinal end is configured to be coupled to the actuator anchor at a tang of the actuator anchor via the first connector and the tang.

3. The actuator assembly of claim 1, wherein the actuator comprises a second connector at the second longitudinal end, and the second longitudinal end is configured to be coupled to the track assembly frame at a steering mount of the track assembly frame via the second connector and the steering mount.

4. The actuator assembly of claim 1, wherein the actuator anchor comprises a tang extending from a main portion of the actuator anchor, and the actuator is coupled to the actuator anchor through the tang.

5. The actuator assembly of claim 1, wherein the actuator anchor is configured to retain the pivot shaft within the tubular member.

6. The actuator assembly of claim 1, wherein the actuator comprises a hydraulic cylinder.

7. The actuator assembly of claim 1, wherein the actuator anchor is coupled to the pivot shaft.

8. An actuator assembly for an implement comprising:
a pivot shaft configured to be received in a tubular member rigidly coupled to an implement frame, wherein the pivot shaft is configured to pivot relative to the tubular member about a generally horizontal pitch axis, the pivot shaft is configured to support a track assembly of the implement, and the pivot shaft is configured to enable the track assembly to pivot about the generally horizontal pitch axis;
an actuator anchor rigidly coupled to the pivot shaft; and
an actuator having a first longitudinal end and a second longitudinal end, wherein the actuator is coupled to the actuator anchor at the first longitudinal end, the actuator is configured to be coupled to a track assembly frame of the track assembly at the second longitudinal end, and the actuator is configured to extend and retract to pivotally steer the track assembly about a generally vertical steering axis.

9. The actuator assembly of claim 8, wherein the actuator anchor is configured to pivot with the pivot shaft.

10. The actuator assembly of claim 8, wherein the actuator anchor is configured to retain at least a portion of the pivot shaft within the tubular member.

11. The actuator assembly of claim 8, wherein the actuator anchor has a longitudinal split, and the actuator anchor is rigidly coupled to the pivot shaft by a fastener that at least partially closes the longitudinal split.

12. The actuator assembly of claim 8, wherein the pivot shaft is configured to couple to a pivot member of the track assembly, and the track assembly frame is configured to rotate relative to the pivot member about the generally vertical steering axis.

13. The actuator assembly of claim 12, comprising a horizontal oscillation pin configured to be disposed through the pivot member and the pivot shaft to couple the pivot member to the pivot shaft, and the horizontal oscillation pin is configured to enable the pivot member to pivot relative to the pivot shaft about a generally horizontal camber axis.

14. An actuator assembly for an implement comprising:
a pivot shaft configured to be received in a tubular member rigidly coupled to an implement frame, wherein the pivot shaft is configured to pivot relative to the tubular member about a generally horizontal pitch axis, the pivot shaft is configured to support a track assembly of the implement, and the pivot shaft is configured to enable the track assembly to pivot about the generally horizontal pitch axis;
an actuator anchor disposed on the pivot shaft;
a first fastener disposed through the actuator anchor and the pivot shaft to rigidly couple the actuator anchor to the pivot shaft, wherein the actuator anchor is configured to pivot with the pivot shaft; and
an actuator having a first longitudinal end and a second longitudinal end, wherein the actuator is coupled to the actuator anchor at the first longitudinal end, the actuator is configured to be coupled to a track assembly frame of the track assembly at the second longitudinal end, and the actuator is configured to extend and retract to pivotally steer the track assembly about a generally vertical steering axis.

15. The actuator assembly of claim 14, wherein the actuator anchor is configured to retain the pivot shaft within the tubular member.

16. The actuator assembly of claim 14, wherein the actuator comprises a first connector at the first longitudinal end, and the first longitudinal end is configured to be coupled to the actuator anchor at a tang of the actuator anchor via the first connector and the tang.

17. The actuator assembly of claim 14, wherein the actuator comprises a second connector at the second longitudinal end, and the second longitudinal end is configured to be coupled to the track assembly frame at a steering mount of the track assembly frame via the second connector and the steering mount.

18. The actuator assembly of claim 14, wherein the actuator anchor comprises a tang extending from a main portion of the actuator anchor, and the actuator is coupled to the actuator anchor through the tang.

19. The actuator assembly of claim 14, wherein the pivot shaft is configured to be coupled to a pivot member of the track assembly.

20. The actuator assembly of claim 19, comprising a horizontal oscillation pin configured to be disposed through the pivot member and the pivot shaft to couple the pivot member to the pivot shaft and to enable the pivot member to pivot relative to the pivot shaft about a generally horizontal camber axis.

\* \* \* \* \*